United States Patent
Shen et al.

(10) Patent No.: US 10,515,260 B2
(45) Date of Patent: Dec. 24, 2019

(54) BODY INFORMATION ANALYSIS APPARATUS AND LIP-MAKEUP ANALYSIS METHOD THEREOF

(71) Applicant: CAL-COMP BIG DATA, INC., New Taipei (TW)

(72) Inventors: Shyh-Yong Shen, New Taipei (TW); Min-Chang Chi, New Taipei (TW); Eric Budiman Gosno, Id (ID)

(73) Assignee: CAL-COMP BIG DATA, INC., New Taipei (TW)

( * ) Notice: Subject to any disclaimer, the term of this patent is extended or adjusted under 35 U.S.C. 154(b) by 118 days.

(21) Appl. No.: 15/870,990

(22) Filed: Jan. 14, 2018

(65) Prior Publication Data

US 2019/0065831 A1 Feb. 28, 2019

(30) Foreign Application Priority Data

Aug. 24, 2017 (CN) .......................... 2017 1 0735441

(51) Int. Cl.
*G06K 9/00* (2006.01)
*G06T 19/00* (2011.01)
(Continued)

(52) U.S. Cl.
CPC ..... *G06K 9/00281* (2013.01); *G06K 9/00248* (2013.01); *G06T 7/0014* (2013.01);
(Continued)

(58) Field of Classification Search
CPC .......... G06K 9/00281; G06K 9/00248; G06K 9/00228; G06T 7/0014; G06T 7/90;
(Continued)

(56) References Cited

U.S. PATENT DOCUMENTS

2007/0058858 A1 3/2007 Harville et al.
2013/0169827 A1 7/2013 Santos et al.
(Continued)

FOREIGN PATENT DOCUMENTS

| CN | 201710735441 | * | 8/2017 | ......... G06K 9/00281 |
| CN | 109242785 | * | 1/2019 | ............. G06T 5/005 |

(Continued)

OTHER PUBLICATIONS

Search Report dated May 22, 2018 of the corresponding European patent application.

(Continued)

*Primary Examiner* — Jerome Grant, II
(74) *Attorney, Agent, or Firm* — Chun-Ming Shih; HDLS IPR Services (57) ABSTRACT

A lip-makeup analysis method adopted by a body information analysis apparatus includes following steps: obtaining an external image through an image capturing module of the body information analysis apparatus; performing positioning actions to each part of a face once the face is recognized from the external image; obtaining a position of the lips after completing the positioning actions; analyzing an average color value of lip-makeup of the lips; comparing the average color value of lip-makeup with a default color value; displaying a comparison result by a display module of the body information analysis apparatus; and, re-executing above steps before assisting actions are finished.

13 Claims, 9 Drawing Sheets

(51) Int. Cl.
*G06T 7/11* (2017.01)
*G06T 7/90* (2017.01)
*G06T 7/00* (2017.01)

(52) U.S. Cl.
CPC .................. *G06T 7/11* (2017.01); *G06T 7/90* (2017.01); *G06T 19/006* (2013.01); *G06T 2207/10024* (2013.01); *G06T 2207/30201* (2013.01)

(58) Field of Classification Search
CPC ...................... G06T 7/11; G06T 19/006; G06T 2207/10024; G06T 2207/30201; G06T 2207/10004
USPC .......................................................... 382/240
See application file for complete search history.

(56) References Cited

U.S. PATENT DOCUMENTS

| | | | | |
|---|---|---|---|---|
| 2013/0343647 | A1* | 12/2013 | Aoki | ........................ H04N 1/62 382/165 |
| 2014/0185931 | A1* | 7/2014 | Aoki | ........................ H04N 1/62 382/167 |
| 2015/0145882 | A1* | 5/2015 | Nguyen | ................ H04N 1/622 345/589 |
| 2016/0224825 | A1* | 8/2016 | Tomita | ............... G06K 9/00268 |

FOREIGN PATENT DOCUMENTS

| | | | | |
|---|---|---|---|---|
| JP | 2001216386 | A | 8/2001 | |
| JP | 2015219797 | A | 12/2015 | |
| JP | 2016129027 | A | 7/2016 | |
| JP | 2016151490 | A | 8/2016 | |
| KR | 101204360 | * | 11/2012 | ............. A45D 40/30 |
| KR | 20130100314 | A | 9/2013 | |
| KR | 20150093930 | A | 8/2015 | |
| WO | 0104839 | A2 | 1/2001 | |
| WO | WO 2015029392 | * | 3/2015 | ............... G06K 9/00 |

OTHER PUBLICATIONS

Office Action dated Dec. 11, 2018 of the corresponding Japan patent application.
Office Action dated May 27, 2019 of the corresponding Korean patent application.
Office Action dated Jul. 23, 2019 of the corresponding Japan patent application.

* cited by examiner

BODY INFORMATION ANALYSIS APPARATUS AND LIP-MAKEUP ANALYSIS METHOD THEREOF

TECHNICAL FIELD

The technical field relates to an analysis apparatus and an analysis method, and specifically relates to a body information analysis apparatus and a lip-makeup analysis method thereof.

DESCRIPTION OF RELATED ART

Applying cosmetics is an important one of multiple routine jobs for womem.

Generally, a user usually sits in front of the mirror for applying cosmetics, or uses apparatuses having the camera and the monitor (such as smart phones, tablets, etc.) to substitute the traditional mirror for applying cosmetics.

However, the user can only check and confirm whether the makeup is done evenly or the color is appropriated or not by his/her bare eyes, that's why some users with less experiences may face the problem in slow makeup speed or terrible makeup quality.

According to the problem, users in this technical field seriously need an auxiliary apparatus, which may assist the users to apply cosmetics quickly and also to optimize the quality of the makeup.

SUMMARY OF THE INVENTION

The invention is directed to a body information analysis apparatus and a lip-makeup analysis method thereof, which may analyze an image of the lips of the user and guide the user when the user is applying cosmetics for lip-makeup, so as to assist the user to apply cosmetics more quickly and accurately.

In one of the exemplary embodiments, the lip-makeup analysis method includes following steps: capturing an external image through an image capturing module of a body information analysis apparatus; performing positioning actions on each facial feature of a face once the face is recognized from the external image; obtaining a position of lips upon the face after completing the positioning actions; analyzing an average color value of a lip-makeup of the lips; comparing an average color value of the lip-makeup with a default color value for generating a comparison result; displaying the comparison result through a display module of the body information analysis apparatus; and, re-executes above steps before auxiliary actions are all completed.

In one of the exemplary embodiments, the body information analysis apparatus at least includes an image capturing module, a display module, and a processor, wherein the image capturing module is arranged to capture an external image, and the processor is arranged to recognize the external image. When recognizing a face from the external image, the processor performs positioning actions on each facial feature of the face for obtaining a position of lips upon the face. Next, the processor analyzes an average color value of a lip-makeup of the lips, and compares the average color value of the lip-makeup with a default color value for generating a comparison result. The display module is arranged to display the comparison result.

In comparison with related art, each embodiment disclosed in the present invention may provide a face look for the user when he or she is applying cosmetics through the body information analysis apparatus, and the user may receive an image analysis upon his or her lips, so as to apply cosmetics for lip-make more quickly and accurately.

DETAILED DESCRIPTION OF THE INVENTION

In cooperation with the attached drawings, the technical contents and detailed description of the present invention are described thereinafter according to multiple embodiments, being not used to limit its executing scope. Any equivalent variation and modification made according to appended claims is all covered by the claims claimed by the present invention.

Figure 1:
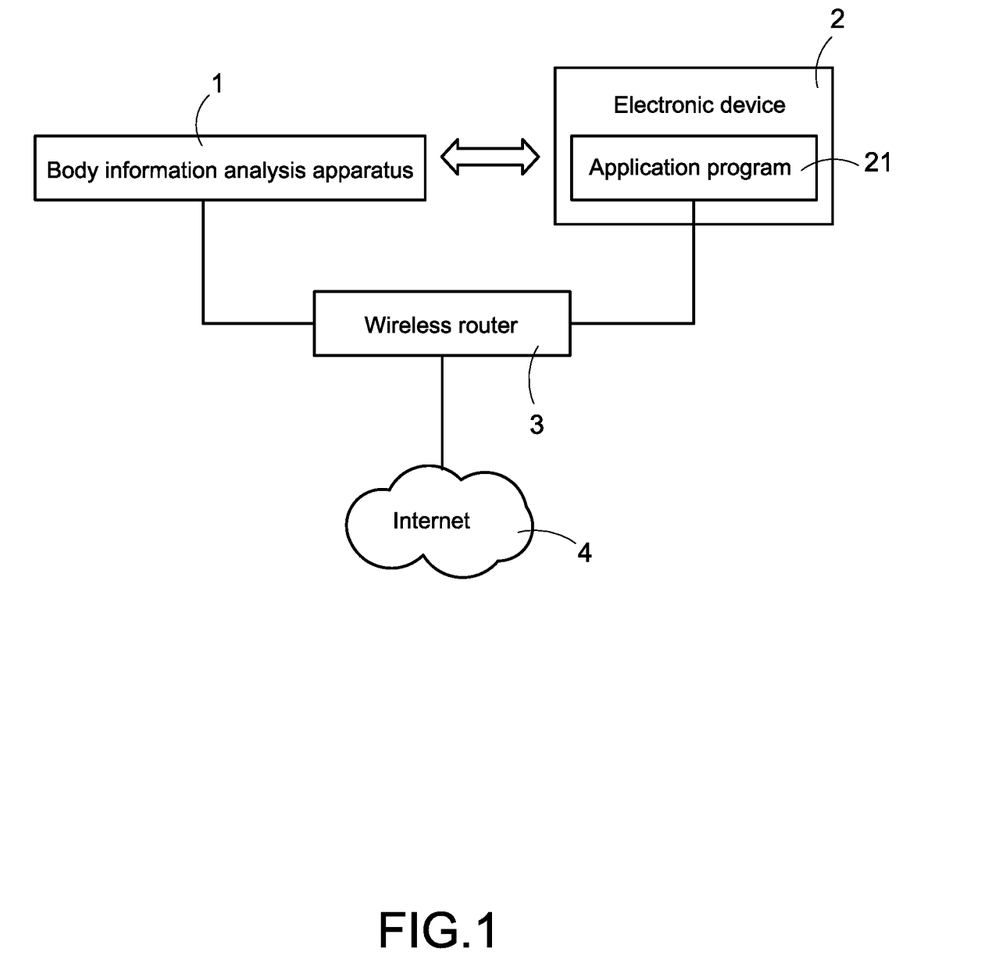
FIG. 1 is a schematic diagram of a system according to a first embodiment of the present invention.

FIG. 1 is a schematic diagram of a system according to a first embodiment of the present invention. The present invention discloses a body information analysis apparatus (referred to as the analysis apparatus hereinafter). The analysis apparatus is used to perform a lip-makeup analysis method (referred to as the analysis method hereinafter), which assists a user in making up the lip-makeup on his or her own face more quickly and accurately.

In one embodiment, the user may perform setting on an analysis apparatus 1 through operating an electronic device 2. As shown in FIG. 1, the electronic device 2 is installed with an application program 21, and is connected with the analysis apparatus 1 through a wireless or wired connection. In particular, the application program 21 may interconnect with the analysis apparatus 1 (for example, the application program 21 may be an application program created and provided by the manufacturer of the analysis apparatus 1). In the present invention, a user may operate the application program 21 executed by the electronic device 2 for completing multiple setting actions on the analysis apparatus 1 (such as registering face information, setting default values, etc.).

In one embodiment, the analysis apparatus 1 and the electronic device 2 are connecting to same wireless router 3 within the arranged area, and they can establish a wireless connection with each other or to the Internet 4 through the wireless router 3. Therefore, the analysis apparatus 1 may perform firmware updating, data uploading, data downloading, etc. through the Internet 4. Besides, the analysis apparatus 1 may collect user's body information and transmit the body information to a remote computer (not shown) through the Internet 4. Therefore, the user may check the body information from a remote end, and an offsite backup purpose may also be accomplished.

Moreover, the analysis apparatus 1 and the electronic device 2 may pair or connect directly through other wireless communication protocols (e.g., Bluetooth pairing, Zigbee connecting, RF connection, etc.), so as to transmit data, commands and signals with each other.

Figure 2:
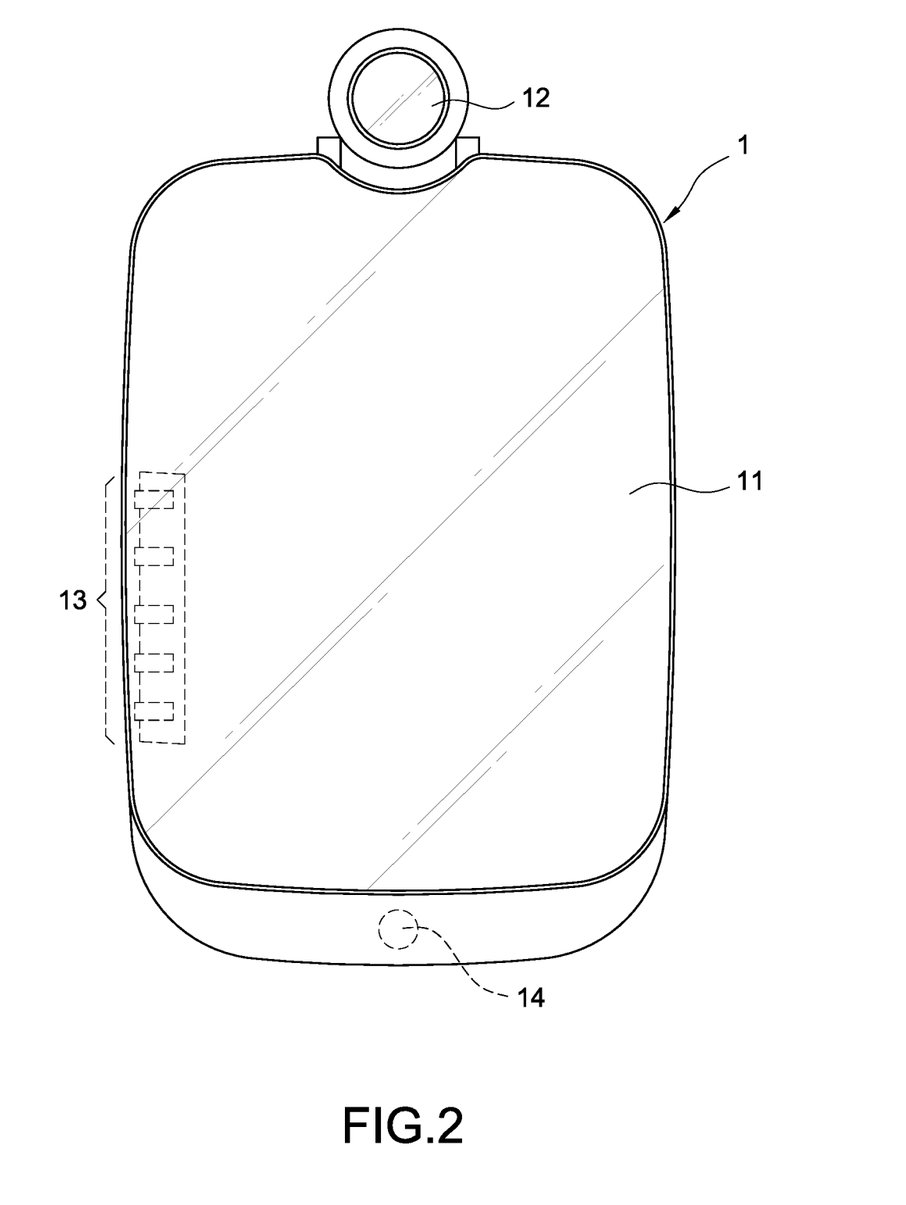
FIG. 2 is a schematic diagram of an analysis apparatus according to a first embodiment of the present invention.
Figure 3:
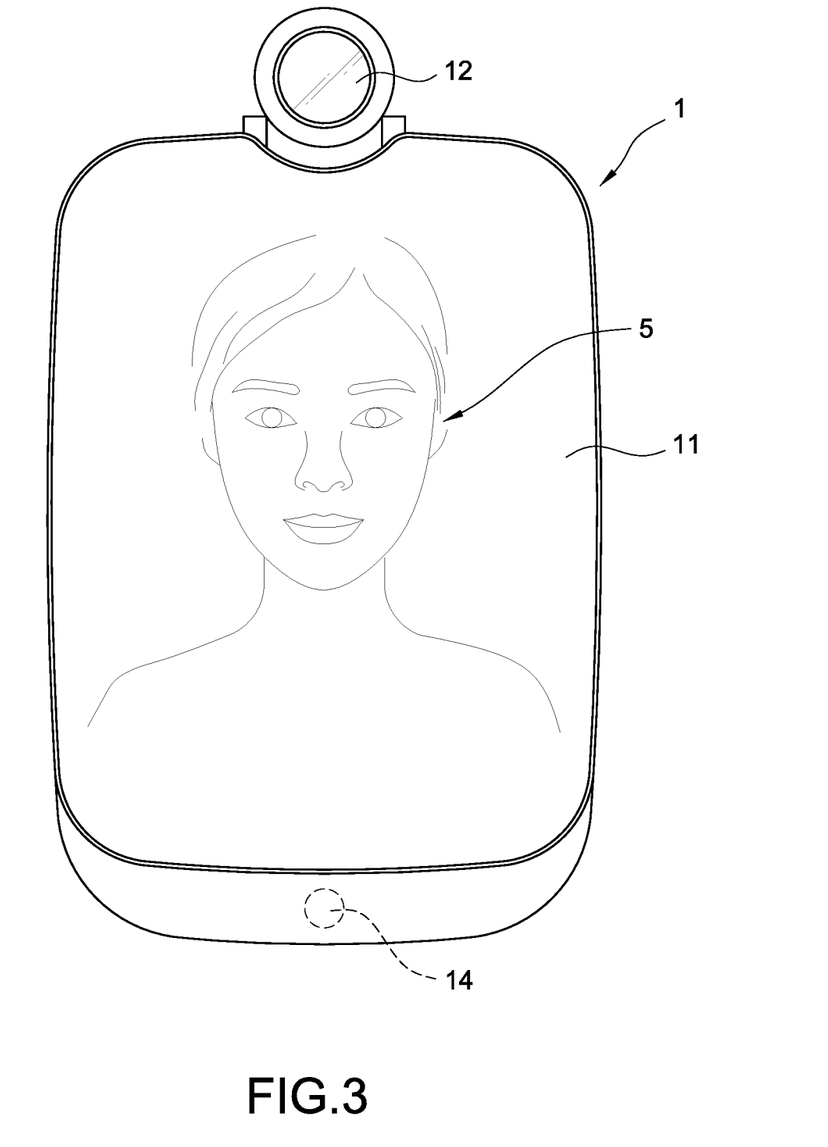
FIG. 3 is a schematic diagram of the analysis apparatus according to a second embodiment of the present invention.

Refers to FIG. 2 and FIG. 3, wherein FIG. 2 is a schematic diagram of an analysis apparatus according to a first embodiment of the present invention, and FIG. 3 is a schematic diagram of the analysis apparatus according to a second embodiment of the present invention. The analysis apparatus 1 in the present invention is basically arranged in the bedroom or the restroom of a user 5 and is used to inspect and analyze user's body information (e.g., the skin situation of the face, the neck, or the hands, etc.), so as to assist the user to apply cosmetics.

The analysis apparatus 1 includes a mirror screen 11. The analysis apparatus 1 displays a graphical user interface (GUI) through the mirror screen 11 for interacting with the user 5 while it is turned on. When the analysis apparatus 1 is turned off, the mirror screen 11 can also be deemed and used as a regular mirror for reflecting the face look of the user 5. One of the main objectives of the present invention is to assist the user 5 in applying cosmetics through the analysis apparatus 1. For doing so, the mirror screen 11 may simultaneously reflect the face look of the user 5 and display the GUI. Therefore, the analysis apparatus 1 may analyze the make-up of the user 5 while the user 5 is applying cosmetics for providing assistances to the user 5 (detailed described in the following).

In one embodiment, the mirror screen 11 may be a touch screen, and the user 5 may perform data input on the analysis apparatus 1 through the mirror screen 11.

The analysis apparatus 1 further includes an image capturing module 12, which is arranged on the analysis apparatus 1 and is adjustable for its setting angle. In one embodiment, the image capturing module 12 may capture high-resolution images for the user 5 (such as face images, neck images, hands images, etc.). Therefore, the analysis apparatus 1 may analyze body information and make-up progress of the user 5 through the captured images. In another embodiment, the image capturing module 12 may capture external messages (such as barcodes, QR codes, etc.), and the analysis apparatus 1 may obtain necessary data according to the content of the captured external messages.

The analysis apparatus 1 further includes multiple buttons 13. In one embodiment, the multiple buttons 13 may be physical buttons or touch keys, not limited thereto. The user 5 may operate the GUI (for example, control the GUI to go back to a home page, to perform a page-up function, to perform a page-down function, etc.), or leads the analysis apparatus 1 to quickly trigger corresponding functions (for example, turns on the mirror screen 11, turns off the mirror screen 11, turns on the image capturing module 12, etc.), by way of pressing the buttons 13.

The analysis apparatus 1 further includes one or more sensors 14 (such as temperature sensors, humility sensors, etc.). The sensors 14 are arranged to detect the environment values around the position where the analysis apparatus 1 is arranged. Therefore, the accuracy of the body information of the user 5 detected and analyzed by the analysis apparatus 1 may be enhanced in accordance with the sensor data. For an instance, if the sensors 14 comprise a pyroelectric infrared radial (PIR) sensor, it can detect whether the user 5 is entering the field of usage of the analysis apparatus 1 in any time. Therefore, the analysis apparatus 1 may leave the standby mode correspondingly for activating the image capturing module 12 for capturing the face image of the user 5 and performing the following analysis processes.

In another embodiment, the above sensors 14 may include a motion sensor. The analysis apparatus 1 may detect user's moving gesture (such as waving left, waving right, waving up, waving down, pushing forward, pulling backward, etc.) through the motion sensor. Therefore, the user 5 may perform data input on the analysis apparatus 1 through the moving gestures without physically touching the aforementioned mirror screen 11 or the buttons 13, so as to prevent the mirror screen 11 and the buttons 13 from retaining fingerprints.

Figure 4:
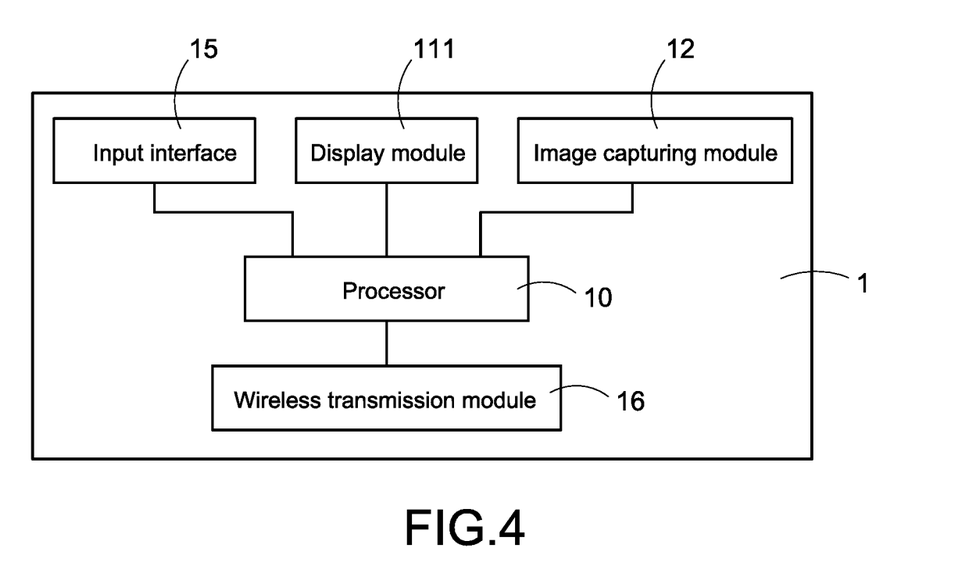
FIG. 4 is a block diagram of the analysis apparatus according to a third embodiment of the present invention.

FIG. 4 is a block diagram of the analysis apparatus according to a third embodiment of the present invention. As shown in FIG. 4, the analysis apparatus 1 mainly includes a processor 10, a display module 111, the image capturing module 12, an input interface 15, and a wireless transmission module 16, wherein the display module 111, the image capturing module 12, the input interface 15, and the wireless transmission module 16 are electrically connected with the processor 10.

In one embodiment, the image capturing module 12 may be a camera. The image capturing module 12 is arranged to capture external images and external messages and provide the captured images and the captured messages to the analysis apparatus 1. The analysis apparatus 1 may perform recognitions on the user 5 through the captured images (for example, a face recognition, a neck recognition, a hand recognition, etc.) so as to analyze each feature of the user 5 (such as the face, the neck, the hand, etc.). Also, the analysis apparatus 1 may also perform relative settings through the content of the captured messages.

The display module 111 is arranged to display the aforementioned GUI. In one embodiment, the display module 111 is arranged inside the mirror screen 11. When the display module 111 is turned on, the light emitted from the display module 111 may penetrate through the mirror screen 11 and the GUI may be displayed right on the mirror screen 11. When the display module 111 is turned off, the user may regard and use the mirror screen 11 as a regular mirror. In one embodiment, the analysis apparatus 1 may adjust the light strength or the display area of the display module 111, thus the mirror screen 11 may simultaneously reflect the image of the user and also display the GUI thereon.

The analysis apparatus 1 may receive external input through the input interface 15, so the user may interact with the GUI or perform necessary settings on the analysis apparatus 1. In one embodiment, the input interface 15 may be the aforementioned sensors 14, so as to detect the gesture inputs from the user. In another embodiment, the input interface 15 may be the image capturing module 12, so as to capture the external images or the external messages. In a further embodiment, the input interface 15 may be the touch screen or the buttons 13, so as to receive input actions directly from the user. In another further embodiment, the input interface 15 may be a microphone, so as to receive external audio.

The wireless transmission module 16 is arranged to assist the analysis apparatus 1 to connect to the Internet 4. In particular, the user may connect to the analysis apparatus 1 from a remote end through the Internet 4 to check each information recorded in the analysis apparatus 1 (such as the body information of the user) in any time.

The processor 10 is arranged to connect with the display module 111, the image capturing module 12, the input interface 15, and the wireless transmission module 16, and the processor 10 may include computer executable program codes (not shown). Upon executing the computer executable program codes, the processor 10 may control all the above modules of the analysis apparatus 1 and performs the analysis method of the present invention.

Figure 5:
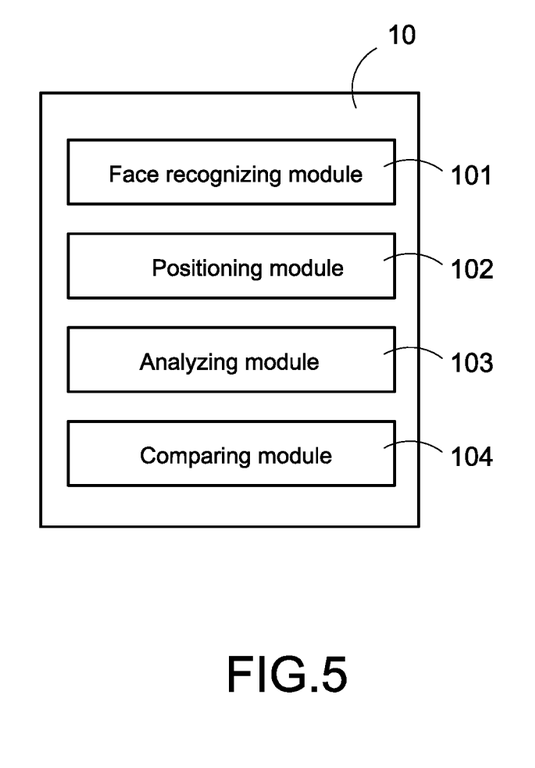
FIG. 5 is a schematic diagram of a processor according to a first embodiment of the present invention.

Refers to FIG. 5, which is a schematic diagram of a processor according to a first embodiment of the present invention. In particular, the processor 10 is configured to accomplish each function of the analysis method of the present invention through executing the aforementioned computer executable program codes, and the computer executable program codes may be divided into multiple function modules set forth below according to different functions:

1. A face recognizing module 101, which is configured to recognize the external image captured by the image capturing module 12, so as to determine whether a face is present in the external image;

2. A positioning module 102, which is configured to perform positioning actions on the face presented in the external image through an algorithm, so as to obtain the positions of each facial feature of the face (for example, eyebrows, eyes, nose, lips, etc.), and the positioning module 102 is mainly configured to obtain the position of the lips upon the face in the present invention;

3. An analysing module 103, which is configured to execute image analysis to the position of the lips, so as to obtain the condition of the current lip-makeup of the lips of the user (such as the color brightness of the lip-makeup, the color distribution of the lip-makeup, etc.); and 4. A comparing module 104, which is configured to compare the condition of the current lip-makeup with a default value, and informs the user about the comparison result (e.g., the color is too bright, the color is too dark, the color distribution is uneven, etc.), so as to provide make-up assistances for the user.

Figure 6A:
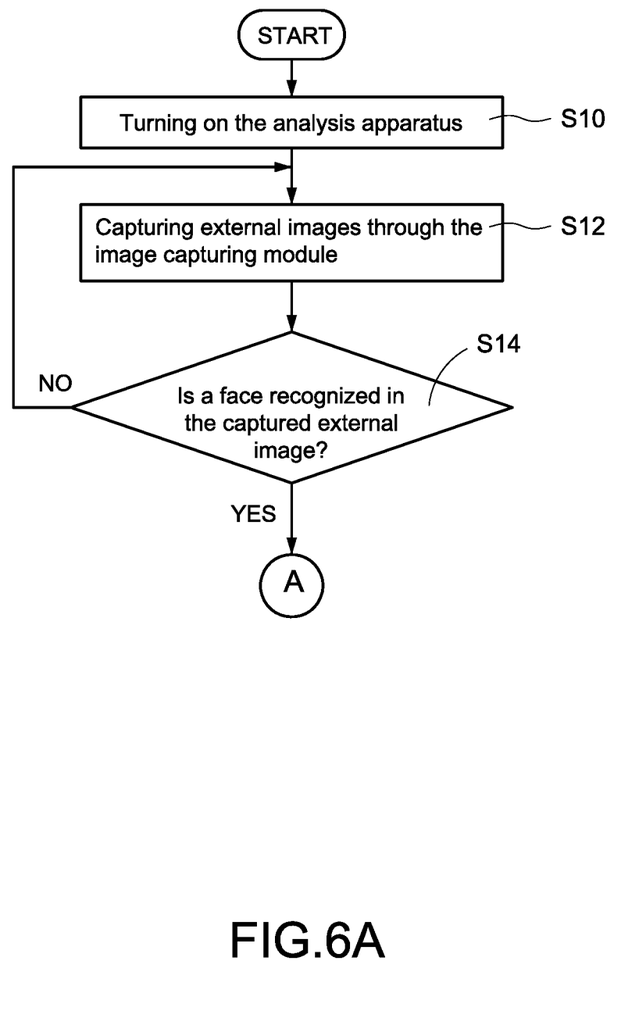
FIG. 6A is a first flowchart for analyzing the lip-makeup according to a first embodiment of the present invention.
Figure 6B:
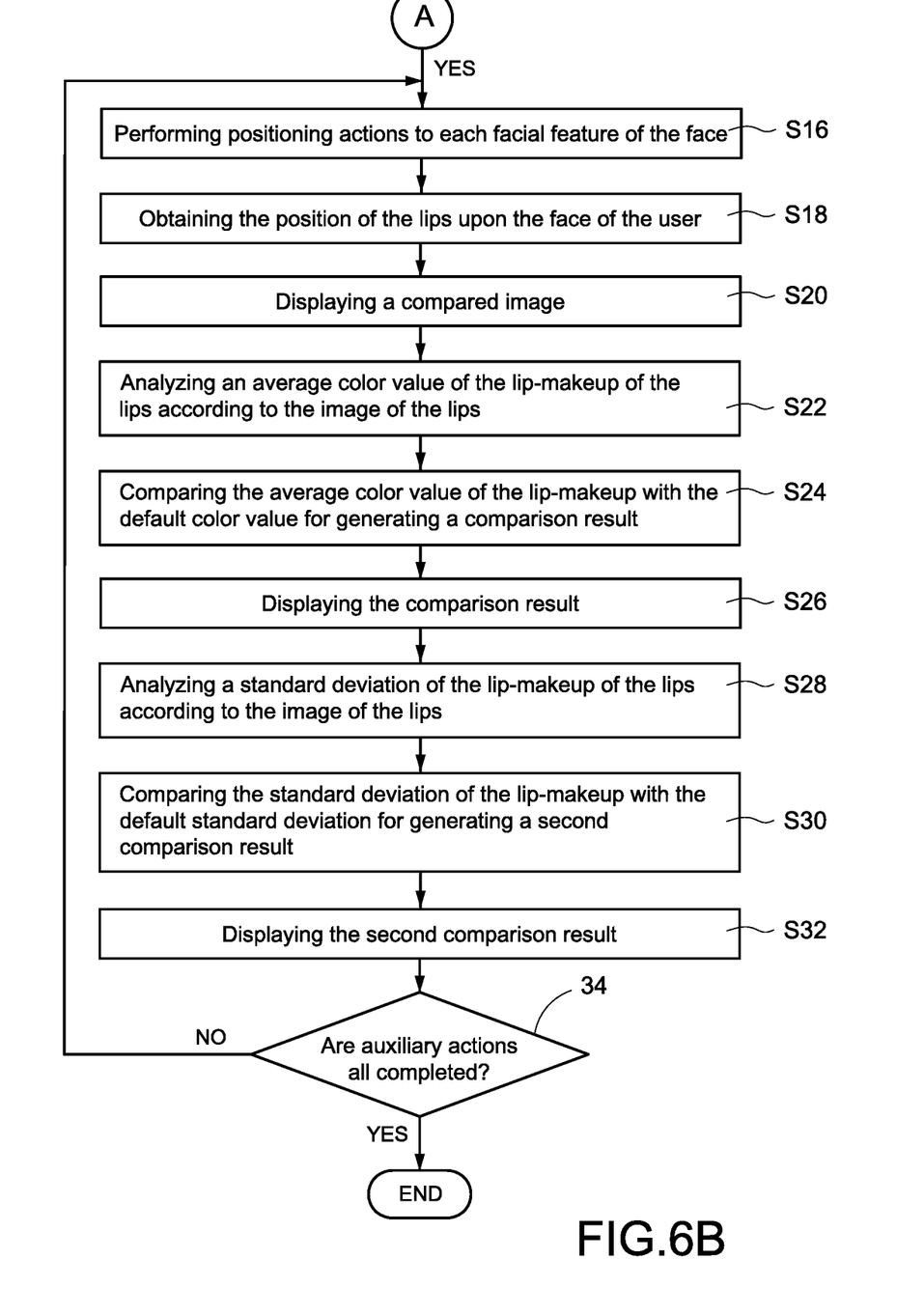
FIG. 6B is a second flowchart for analyzing the lip-makeup according to the first embodiment of the present invention.

FIG. 6A is a first flowchart for analyzing the lip-make according to a first embodiment of the present invention. FIG. 6B is a second flowchart for analyzing the lip-makeup according to the first embodiment of the present invention. FIG. 6A and FIG. 6B are used to describe the steps of the analysis method of the present invention, and these steps are in particular adopted by the analysis apparatus 1 as shown in FIG. 1 to FIG. 5. More specific, the analysis apparatus 1 executes aforementioned computer executable program codes (i.e., the above function modules 101-104) through the processor 10 for accomplishing each step as described in the following.

As shown in FIG. 6A, to perform the analysis method through the analysis apparatus 1 of the present invention for assisting the user in applying cosmetics, the user first turns the analysis apparatus 1 on (step S10). In one embodiment, the user may trigger the touch screen or the buttons 13 to turn the analysis apparatus 1 on. In another embodiment, the analysis apparatus 1 may automatically enter a standby mode after receiving power, and the user may input gestures through the image capturing module 12 or the sensors 14 for activating the analysis apparatus 1 from the standby mode, but not limited thereto.

In particular, the analysis apparatus 1 may include multiple modes capable of different functions. In one embodiment, the analysis apparatus 1 is automatically entering an auxiliary mode for assisting the user in applying cosmetics after it is turned on. In another embodiment, the analysis apparatus 1 may automatically enter the standby mode after it is turned on, and enters the auxiliary mode after receiving the corresponding command from the user.

After being turned on, the analysis apparatus 1 keeps capturing external images through the image capturing module 12 (step S12), and the processor 10 of the analysis apparatus 1 keeps determining whether a face is present in the captured external images (step S14). In one embodiment, the processor 10 obtains an external image from the image obtaining mdoule 12, and performs a face recognition on the external image through the face recognizing module 101, so as to determine whether a face is present in the external image or not.

If no face is recognized from the external image, the analysis apparatus 1 re-executes the step S12 and the step S14 for continually capturing and analyzing external images. For example, if only a bed, a door, or a chair is present in the external image (means there's no human exists in the bedroom), or only the body or the back of the user is present in the external image (means the user doesn't want to use the analysis apparatus 1), the analysis apparatus 1 will not perform the analysis method of the present invention.

As shown in FIG. 6B, if the processor 10 determines that a face is present in the external image after the face recogniztion, it then performs positioning actions on each part (basically on each facial feature) of the face (step S16). In one embodiment, the processor 10 may further determine if the size of the face is larger than a specific ratio or not (for example, the face occupies the external image more than 40%) after the face is recognized from the external image. In this scenario, the process 10 performs the positioning actions on each facial feature of the face only if the size of the face in the external image is larger than the specific ratio.

In one embodiment, the processor 10 renders the face image to the aforementioned positioning module 102 after determining that the face is present in the external image, so the positioning module 102 may perform the positioning actions on the face image and then obtain the actual positions of each facial feature of the face. In this embodiment, the positioning mdoule 102 may obtain at least the position of the lips upon the face of the user after completing the positioning actions (step S18).

It should be noted that the positioning module 102 in the embodiment may perform the positioning actions on each facial feature of the face through a Dlib Face Landmark system, but not limited thereto.

Figure 7:
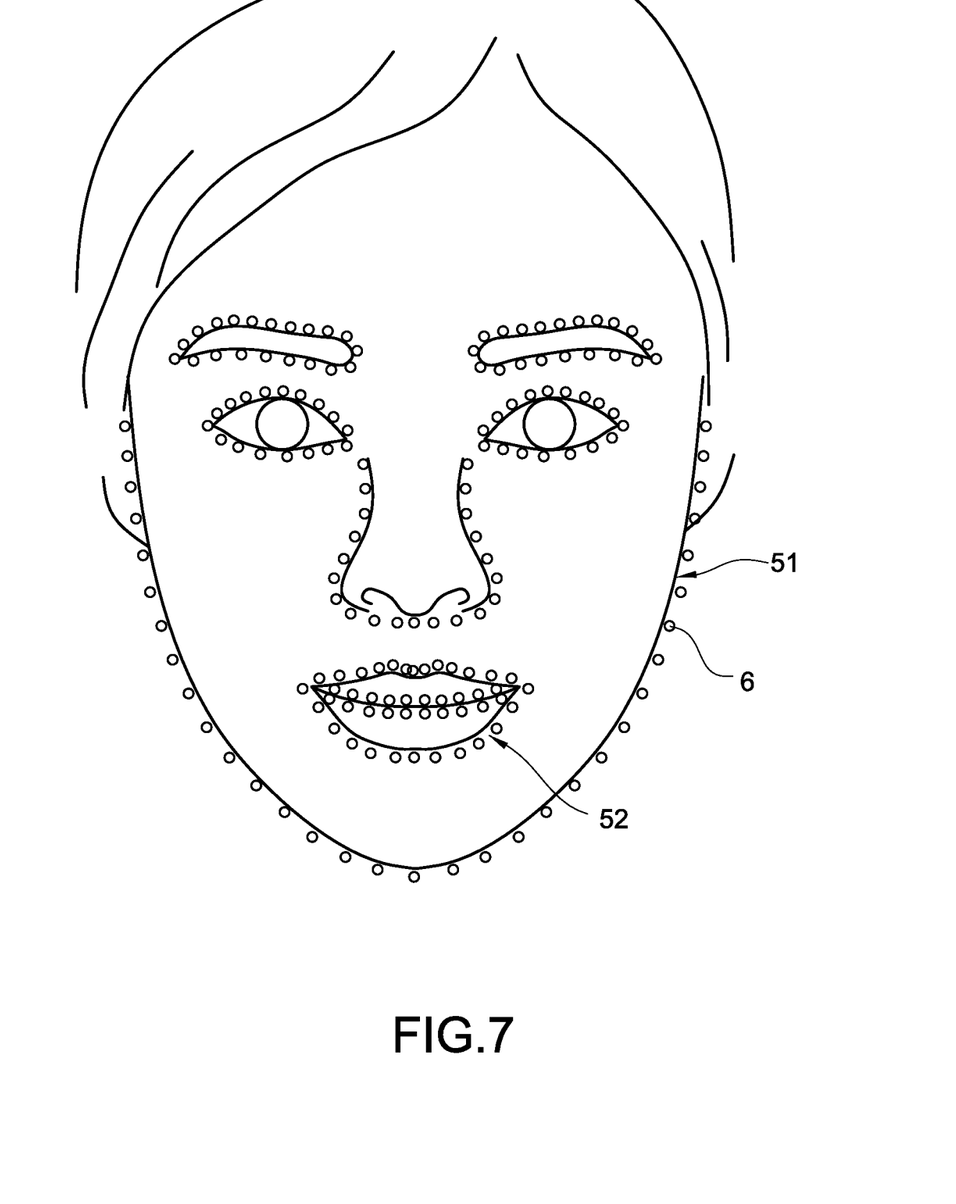
FIG. 7 is a schematic diagram for positioning a face.

FIG. 7 is a schematic diagram for positioning a face. When determining that a face is present in the external image, the processor 10 further performs image analysis on the image of a face 51 through the Dlib Face Landmark system. The Dlib Face Landmark system is a common technical solution in the technical field, which can generate multiple positioning points 6 in the image of the face 51 after completing the image analysis (such as 198 positioning points). Therefore, the Dlib Face Landmark system may figure out the positions of each facial feature of the face 51 according to the serial number, the shape, the order, etc. of the multiple positioning points 6 for accomplishing the positioning actions.

In this embodiment, the positioning module 102 may obtain multiple positioning points 6 upon the face 51 that are distributed around the lips 52 (for example, hundred and nineteen positioning points 6) after completing the positioning actions. Next, the positioning module 102 connects the multiple obtained positioning points 6 for forming one or more positioning auxiliary lines. Finally, the positioning module 102 may regard the area(s) surrounding by the one or more positioning auxiliary lines as the position of the lips 52 on the face 51.

Refer back to FIG. 6B. In one of the exemplary embodiments, the processor 10 may compare the lips image of the user with a default image, so as to determine the condition of the current lip-makeup of the lips of the user. In doing so, the analysis apparatus 1 in this embodiment may optionally display a compared image adopted by the processor 10 through the display module 111 (step S20). In this embodiment, the above compared image may be an augmented reality (AR) image pre-stored in the analysis apparatus 1, but not limited thereto.

In another embodiment, the user may select one of the specific lip-makeup products (such as specific brands or specific models of lipsticks) or specific lip-makeup effects pre-stored in the analysis apparatus 1. Otherwise, the user may manually input one or more desired lip-makeup products to the analysis apparatus 1 for the analysis apparatus 1 to generate corresponding effects automatically. The aforementioned AR image may be generated by the analysis apparatus 1 through combining the user image captured by the image capturing module 12 with the effect selected by the user in advance and overlapped onto the lips position of the user image. Otherwise, the user may store the corresponding effect and/or the AR image to the analysis apparatus 1 if the selected effect satisfies the user.

In another embodiment, the analysis apparatus 1 may be embedded with multiple AR images while it's produced, and the user may select one of the multiple AR images as the aforementioned compared image through the input interface 15. Besides, the user may input favorite compared image(s) to the analysis apparatus 1 through I/O devices or through the Internet 4, so the processor 10 may perform aforementioned comparing actions based on the user preferred compared images. In this embodiment, the compared images are face images, which respectively indicate all or partial facial features at least including the lips, but not limited thereto.

It should be mentioned that the analysis apparatus 1 may pre-store multiple default values (such as a default color value described in the following) directly for being compared. Under this circumstance, the analysis apparatus 1 is unnecessary to store the aforementioned compared images, which means the above step S20 may be omitted.

After the step S18, the processor 10 at least obtains the lips position of the user. Next, the processor 10 may analyze an average color value of the lip-makeup of the lips according to the image of the lips (step S22). In one embodiment, the processor 10 renders the image of the lips to the aforementioned analyzing module 103, so the analyzing module 103 may analyze the average color value of the lip-makeup of the lips. In one embodiment, the analyzing module 103 may apply multiple image analyzing algorithms of the related art for analyzing the average color value of the current lip-makeup of the user according to the image of the lips.

In particular, the calculation of the above average color value may be performed by the processor 10 through analyzing and indicating the obtained lips image by different color space formats. The above color space formats may be RGB color space, HSV color space, HSL color space, etc., not limited thereto. According to the analysis method adopted by the processor 10, the processor 10 may use two or more color space formats simultaneously, or may take a measure of weight therefrom for analyzing.

For example, if the adopted color space format is the HSV color space, the color of each pixel of the obtained lips image may be indicated by multiple measures of weight including "Hue", "Saturation", and "Value". If the adopted color space format is the RGB color space, the color of each pixel of the obtained lips image may be indicated by multiple measures of weight including "Red", "Green", and "Blue".

After the step S22, the processor 10 may obtain a default color value, and compares the average color value of the lip-makeup with the default color value for generating a comparison result (step S24).

In one embodiment, the processor 10 may perform image analysis on the aforementioned compared image (i.e., the AR image selected by the user) through the analyzing module 103 (the image analysis is mainly performed to the lips position of the compared image), so as to obtain the aforementioned default color value. Therefore, the processor 10 may renders the average color value of the current lip-makeup and also the default color value to the comparing module 104, so the comparing module 104 may compare the average color value with the default color value for generating the comparison result.

In another embodiment, the processor 10 may pre-store the default color value by the comparing module 104 directly. The processor 10 may render the average color value of the lip-makeup to the comparing module 104 after the step S22, so the comparing module 104 may directly compare the average color value of the lip-makeup with the pre-stored default color value for generating the comparison result. In this embodiment, the default color value may record standard color or standard brightness pre-stored by the analysis apparatus 1, or record ideal color or ideal brightness preset by the user. Therefore, the analysis apparatus 1 does not need to additionally store the aforementioned compared images, so the storage space of the analysis apparatus 1 can be saved.

After the step S24, the analysis apparatus 1 may display the comparison result on the mirror screen 11 through the display module 111 (step S26). The user may obtain the condition about the current lip-makeup of the lips right on the mirror screen 11 (for example, the brightness of the lip-makeup is higher than or lower than the standard brightness (or the brightness of the compared image)), so as to be served for assistances by the analysis apparatus 1.

In one embodiment, the average color value and the default color value mentioned above are pixel values within 0 to 255, the comparison result is a percentage, and the comparing module 104 generates the comparison result through executing the formula: |default color value−average color value|/255*100%. However, the above description is only an embodiment, not intended to narrow down the scope of claims of the present invention.

In one embodiment, the processor 10 further analyzes a standard deviation (SD) of the lip-makeup of the lips according to the image of the lips (step S28). In one embodiment, the processor 10 renders the image of the lips to the analyzing module 103, so the analyzing module 103 may analyze the standard deviation of the lip-makeup of the lips. Similarly, the analyzing module 103 may apply multiple image analyzing algorithms of the related art to analyze the standard deviation of the lip-makeup according to the image of the lips. In particular, the standard deviation in this embodiment indicates the standard deviation of the color of the lip-makeup.

After the step S28, the processor 10 may obtain a pre-stored default standard deviation, and compares the above standard deviation of the lip-makeup with the default standard deviation for generating a second comparison result (step S30).

In one embodiment, the processor 10 may perform image analysis on the aforementioned compared image (such as the AR image) through the analyzing module 103 for obtaining the default standard deviation. Then, the processor 10 compares the above standard deviation of the lip-makeup with the default standard deviation through the comparing module 104 for generating the second comparison result.

In another embodiment, the processor 10 may pre-store the default standard deviation by the comparing module 104, and renders the standard deviation of the lip-makeup to the comparing module 104 after the step S28. Under this circumstance, the comparing module 104 may directly compare the standard deviation of the lip-makeup with the pre-stored default standard deviation for generating the second comparison result.

After the step S30, the analysis apparatus 1 may display the second comparison result on the mirror screen 11 through the display module 111 (step S32). The user may check whether the current lip-makeup has an uneven issue or not (for example, the color distribution of the current lip-makeup may lower than the standard color distribution, such as lower than the color distribution of the lips position of the compared image), and proceeds with a repairing action to which is uneven.

It should be noted that the step S22 to the step S26, and the step S28 to the step S32, are not having a constant execution order. The analysis apparatus 1 may alternatively calculate and display the comparison result or the second comparison result first, or calculate and display both the comparison result and the second comparison result simultaneously through multiplex processing, it is not limited to the step order shown in FIG. 6B.

In one embodiment, the standard deviation and the default standard deviation are similar to the aforementioned average color value and default color value, which may be pixel values within 0 to 255. The second comparison result is similar to the aforementioned comparison result, which may be a percentage. In this embodiment, the comparing module 104 may generate the second comparison result through executing the formula: |default standard deviation−standard deviation|/255*100%. However, the above description is only one of the exemplary embodiments, not intended to narrow down the scope of the claims of the present invention.

Next, the analysis apparatus 1 determines whether the auxiliary actions provided for the user are completed (step S34). Before the auxiliary actions are completed, the analysis apparatus 1 re-executes the step S16 to the step S32 for continually recognizing the face 51 of the user, positioning the facial features of the face 51, obtaining the image and the position of the lips, analyzing the average color value and the standard deviation of the lip-makeup of the lips, and generating and displaying the comparison result and the second comparison result. Otherwise, once the auxiliary actions are all completed, the analysis apparatus 1 terminates the analysis method. Through re-executing the aforementioned step S16 to step S32, the analysis apparatus 1 and the analysis method of the present invention may accomplish a real-time make-up auxiliary function.

For an instance, the analysis apparatus 1 may perform image analysis on the face 51 of the user, and display the comparison result for indicating that the color of the current lip-makeup of the user is 5% darker than the standard color. According to the comparison result, the user may repair the lip-makeup. In the middle of the repairing, the analysis apparatus 1 keeps analyzing the face 51 of the user, and it adjusts the comparison result for indicating that the color of the current lip-makeup of the user is now 3% darker than the standard color.

According to the adjusted comparison result, the user may keep repairing the lip-makeup. Still the analysis apparatus 1 keeps analyzing the face 51 of the user. Next, the analysis apparatus 1 again adjusts the comparison result for indicating that the color of the current lip-makeup of the user is now 1.5% darker than the standard color, and so on. Therefore, the user may keep repairing the lip-makeup until the color/brightness of the lip-makeup is identical or similar to the standard color/standard brightness. In this embodiment, the standard color/standard brightness is the color/brightness pre-stored by the analysis apparatus 1, or the color/brightness of the lips position of the user selected AR image, but not limited thereto.

In one embodiment, the analysis apparatus 1 in the step S34 is to determine whether the analysis apparatus 1 is turned off or not. In this embodiment, the analysis apparatus 1 may re-execute the step S16 to the step S32 before it is turned off, and the analysis apparatus 1 may terminate the analysis method after that. Therefore, the analysis apparatus 1 may keep providing the real-time make-up auxiliary function while it is on.

In one embodiment, the analysis apparatus 1 in the step S34 is to determine whether the comparison result (and the second comparison result) complies with a completion standard or not. For example, the analysis apparatus 1 may determine whether the above average color value of the current lip-makeup is equal to or similar to the default color value according to the comparison result, and determines whether the above standard deviation of the current lip-makeup is equal to or similar to the default standard deviation according to the second comparison result. Next, the analysis apparatus 1 may determine that the comparison result (and the second comparison result) complies with the completion standard once the average color value of the lip-makeup is equal to or similar to the default color value and the standard deviation of the lip-makeup is equal to or similar to the default standard deviation.

Similarly, the analysis apparatus 1 in this embodiment may re-execute the step S16 to the step S32 before the comparison result (and the second comparison result) complies with the completion standard, and may terminate the analysis method after that.

Figure 8:
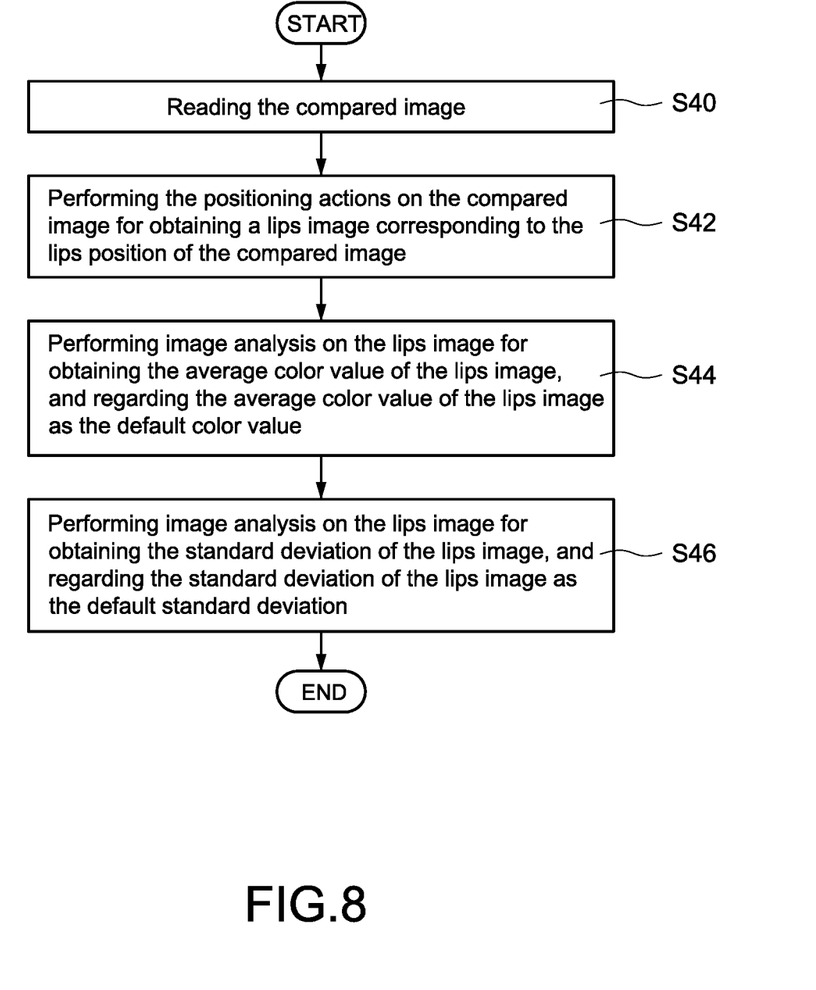
FIG. 8 is a flowchart for analyzing default values according to a first embodiment of the present invention.

FIG. 8 is a flowchart for analyzing default values according to a first embodiment of the present invention. FIG. 8 is used to further describe the aforementioned default color value and the default standard deviation.

In the embodiment, the analysis apparatus 1 may read one of the multiple pre-stored compared images by the processor 10 (step S40). Next, the processor 10 may perform the positioning actions on the selected compared image through the positioning module 102, so as to obtain a lips image corresponding to the lips position of the compared image (step S42). In this embodiment, the compared image read by the processor 10 in the step S40 is a face image or a partial face image at least including an image of the lips.

Next, the processor 10 performs image analysis on the lips image through the analyzing module 103 for obtaining the average color value of the lips image, and regards the obtained average color value of the lips image as the aforementioned default color value (step S44). On the other hand, the processor 10 also performs image analysis on the lips image through the analyzing module 103 for obtaining the standard deviation of the lips image, and regards the obtained standard deviation of the lips image as the aforementioned default standard deviation (step S46). In the embodiment, the analyzing module 103 may apply one or multiple image analyzing algorithms of the related art for analyzing the default color value and the default standard deviation according to the lips image.

In one of the exemplary embodiments, the user may operate the analysis apparatus 1 before applying cosmetics, and then selects one of the multiple compared images displayed by the display module 111 of the analysis apparatus 1 through the input interface 15. Therefore, the user may first check the selected compared image through the mirror screen 11 for confirming the appearance after applying cosmetics, and decides whether to apply the current displayed compared image or not. As such, the analysis apparatus 1 may compare the condition of the current lip-makeup of the user with the compared image selected by the user in such auxiliary mode for assisting the user to quickly complete the lip-makeup identical to the compared image.

Figure 9:
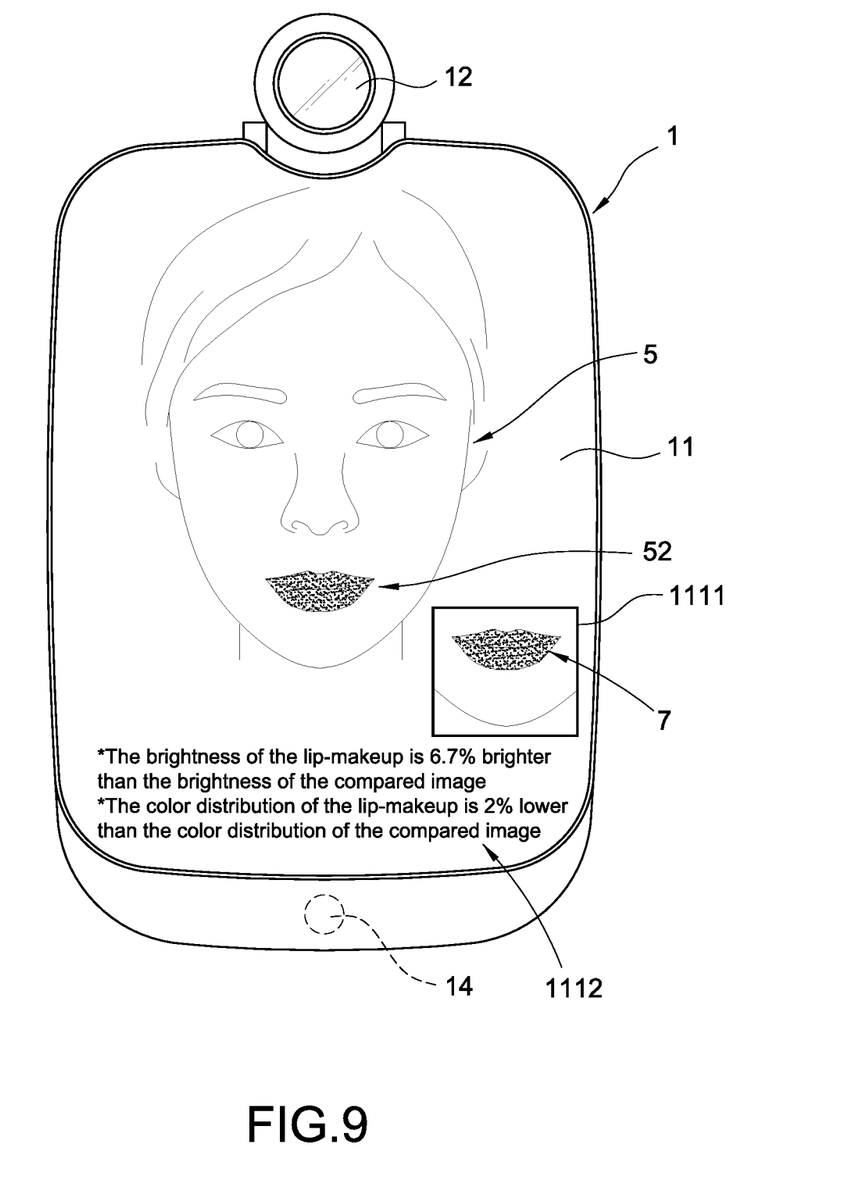
FIG. 9 is a schematic diagram of the analysis apparatus according to a fourth embodiment of the present invention.

FIG. 9 is a schematic diagram of the analysis apparatus according to a fourth embodiment of the present invention. As mentioned above, the analysis apparatus 1 of the present invention is to capture the face image of the user 5 in real-time and analyze the condition of the current lips 52 of the user 5. Besides, the analysis apparatus 1 may provide an image displaying area 1111 on the mirror screen 11, so as to real-time display the selected compared image 7 (such as an AR image) that is compared with the lips 52 of the user 5.

More specific, the analysis apparatus 1 may read the compared image 7 selected by the user 5 from the multiple compared images for processing in advance (such as an enlargement processing), then the analysis apparatus 1 controls the display module 111 to display the entire compared image 7 on the image displaying area 1111, or partially displays a close-up image corresponding to the lips position of the compared image 7 on the image displaying area 1111.

As shown in FIG. 9, the mirror screen 11 further includes an information displaying area 1112. The analysis apparatus 1 may control the display module 111 to display the aforementioned comparison result (and the second comparison result) on the information displaying area 1112 of the mirror screen 11.

In this embodiment, the user 5 may see a reflect image of his/her own face and lips 52 right on the mirror screen 11, and may see the compared image 7 through the image displaying area 1111, and may realize whether the condition (such as the color, the distribution, etc.) of the current lip-makeup of the lips 52 differs from a standard value or not (for example, differs from the displayed compared image 7) through the information displaying area 1112.

For an instance, the comparison result in FIG. 9 shows that the brightness of the current lip-makeup is 6.7% brighter than that of the compared image 7, and the color distribution of the current lip-makeup is 2% lower than that of the compared image 7. Therefore, the analysis apparatus 1 may effectively assist the user 5 in applying cosmetics for the lips 52, so as to increase the make-up speed of the user 5 and also optimize the make-up quality.

By way of the analysis apparatus 1 and the analysis method of the present invention, the user 5 may see his/her face look on the mirror screen 11 and also receive an image analysis upon his/her lips 52 while applying cosmetics, so as to apply cosmetics more quickly and accurately.

As the skilled person will appreciate, various changes and modifications can be made to the described embodiment. It is intended to include all such variations, modifications and equivalents which fall within the scope of the present invention, as defined in the accompanying claims.

What is claimed is:

1. A lip-makeup analysis method adopted by a body information analysis apparatus, comprising:
   a) capturing an external image through an image capturing module of the body information analysis apparatus;
   b) performing positioning actions on each facial feature of a face once the face is recognized from the external image by a processor of the body information analysis apparatus;
   c) obtaining a position of lips upon the face following step b);
   d) analyzing an average color value of a lip-makeup of the lips by the processor;
   e) comparing the average color value of the lip-makeup with a default color value for generating a comparison result;
   f) displaying the comparison result through a display module of the body information analysis apparatus;
   g) analyzing a standard deviation (SD) of the lip-makeup of the lips by the processor;
   h) comparing the standard deviation of the lip-makeup with a default standard deviation for generating a second comparison result; and
   i) displaying the second comparison result through the display module.

2. The lip-makeup analysis method in claim 1, further comprising following steps before the step e):
   e01) reading a compared image, wherein the compared image is a face image;
   e02) performing the positioning actions on the face image for obtaining a lips image; and
   e03) analyzing an average color value of the lips image for being the default color value.

3. The lip-makeup analysis method in claim 2, further comprising:
   j) displaying the compared image through the display module, wherein the compared image is an augmented reality (AR) image.

4. The lip-makeup analysis method in claim 1, further comprising following steps:
   k1) determining whether the body information analysis apparatus is turned off; and
   k2) re-executing the step b) to the step f) before the body information analysis apparatus is turned off.

5. The lip-makeup analysis method in claim 1, further comprising following steps:
   l1) determining whether the comparison result is matching with a completion standard; and
   l2) re-executing the step b) to the step f) before the comparison result is determined matching with the completion standard.

6. The lip-makeup analysis method in claim 1, further comprising following steps before the step h):
   h01) reading a compared image, wherein the compared image is a face image;
   h02) performing the positioning actions on the face image for obtaining a lips image; and
   h03) analyzing a standard deviation of the lips image for being the default standard deviation.

7. The lip-makeup analysis method in claim 6, further comprising:
   m) displaying the compared image through the display module, wherein the compared image is an augmented reality (AR) image.

8. The lip-makeup analysis method in claim 1, wherein the step b) is to perform the positioning actions on each facial feature of the face through a Dlib Face Landmark system.

9. A body information analysis apparatus, comprising:
an image capturing module, arranged to capture an external image;
a display module; and
a processor electrically connected with the image capturing module and the display module, the processor is arranged to recognize the external image for determining whether a face is present in the external image by a face recognizing module, and to perform positioning actions on each facial feature of the face once the face is recognized from the external image for obtaining a position of lips upon the face by a positioning module;
wherein, the processor is arranged to analyze an average color value of a lip-makeup of the lips by an analyzing module through an algorithm, and to compare the average color value of the lip-makeup with a default color value for generating a comparison result by a comparing module;
wherein, the processor is also configured to control the analyzing module to analyze a standard deviation (SD) of the lip-makeup of the lips, and control the comparing module to compare the standard deviation of the lip-makeup with a default standard deviation for generating a second comparison result;
wherein, the display module is arranged to display the comparison result and the second comparison result.

10. The body information analysis apparatus in claim 9, wherein the processor is arranged to read a compared image, and controls the positioning module to perform the positioning actions on the compared image for obtaining a lips image from the compared image, and controls the analyzing module to analyze the lips image for obtaining an average color value of the lips image for being the default color value, wherein the compared image is a face image.

11. The body information analysis apparatus in claim 9, wherein the compared image is an augmented reality (AR) image.

12. The body information analysis apparatus in claim 9, wherein the processor is configured to read a compared image, and controls the positioning module to perform the positioning actions on the compared image for obtaining a lips image, and controls the analyzing module to analyze the lips image for obtaining a standard deviation of the lips image for being the default standard deviation, wherein the compared image is a face image.

13. The body information analysis apparatus in claim 9, wherein the positioning module is configured to perform the positioning actions on each facial feature of the face through a Dlib Face Landmark system.

* * * * *